United States Patent Office 3,278,566
Patented Oct. 11, 1966

3,278,566
SULFOXIDE CONTAINING HIGHER FATTY ACID
George M. Calhoun, Cleveland, Ohio, assignor to Shell Oil Company, New York, N.Y., a corporation of Delaware
No Drawing. Original application Dec. 23, 1960, Ser. No. 77,781, now Patent No. 3,198,737, dated Aug. 3, 1965. Divided and this application Jan. 25, 1965, Ser. No. 427,922
4 Claims. (Cl. 260—400)

This patent application is a division of copending patent application, Serial No. 77,781, filed December 23, 1960 and which matured as U.S. Patent 3,198,737 on August 3, 1965.

The invention relates to a new and novel class of oil-soluble polysulfoxy esters. These oil-soluble compounds are particularly useful as improving agents for lubricating oil compositions and are obtained by hydrogen peroxide or per(carboxylic) acid treating (a) an ester of a long chain unsaturated fatty acid, RCOOH, and a polyoxyalkylene diol or its thio derivative having the formula

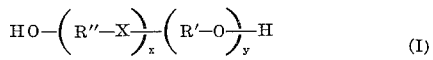
(I)

where R' and R'' are the same or different alkyl radicals of from 2 to 8, preferably 2 to 3 carbon atoms, X is oxygen or sulfur and $x$ and $y$ are integers of at least 1, preferably 1 to 6 with (b) a mercapto compound such as a mercapto acid, alcohol, ether or ester so that the end product has at least 1 and preferably 2 thioether radicals —S(CH$_2$)$_n$Z, where Z is —OR''' and the R''' is hydrogen or a C$_{1-4}$ alkyl radical and $n$ is an integer of from 1 to 4, preferably 1. The maximum number of —S(CH$_2$)$_n$Z units in the compound thus formed depends on the degree of unsaturation of the ether-ester. The unsaturated fatty acid ester of the polyoxyalkylene glycol may be represented by the corresponding formula

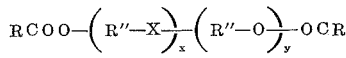

and the thioether thereof by the formula

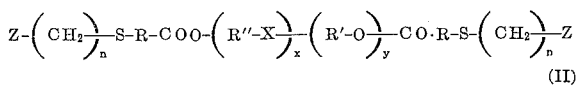
(II)

On treatment of compounds of Formula II with hydrogen peroxide or per(carboxylic) acid the sulfur in said compounds (II) is converted to sulfoxide groups and the final compound thus formed has the formula

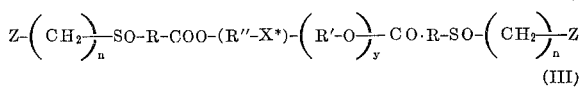
(III)

where the symbols Z, R, R', R'', X and $n$ are the same as in (II). The X* is SO when X is S.

The ether-esters are prepared by esterifying a long chain unsaturated fatty acid such as unsaturated fatty acid having at least 18 carbon atoms, oleic acid, linoleic acid, linolenic acid, erucic acid, ricinoleic acid and the like with a polyalkylene diol or the thio derivatives thereof, such as polyethylene glycols, e.g., diethylene glycol, triethylene glycol, tetraethylene glycol, dipropylene glycol, tripropylene glycol, dibutylene glycol, 2,2'-thiodiethanol, 3,3'-thiodipropanol and the like. Esters of these materials include diethylene glycol dioleate, triethylene glycol dioleate, dipropylene glycol dioleate, diethylene glycol linoleate, tetraethylene glycol ricinoleate, dibutylene glycol oleate, 2,2'-thiodiethanol dioleate, 2,2'-thiodiethanol diricinoleate, 2,2'-thiodiethanol linoleate and the like.

The ether-ester (1) is then reacted with (2) a mercapto compound such as mercapto aliphatic carboxylic acids, e.g., mercaptoacetic acid, mercaptopropionic acid, mercaptobutyric acid, or mercaptoalkanols such as 2-mercaptoethanol, 3- and 3-mercaptopropanol, 2-, 3- and 4-mercaptobutanol or ethers of said mercapto alcohols such as methyl or octyl 2-mercaptoethenyl or mercapto esters, e.g., ethyl mercaptoacetate or ethyl mercaptobutyrate, and mixtures tereof. The reaction of (1) and (2) can be carried out by the methods described in Koenig et al. JACS 79, 362 (1957) or Fitzgerald, Jr. Org. Chem. 22, 197 (1957) and preferably at low temperatures, from room temperature to about 50° C., in the presence of a free radical catalyst such as azo or peroxide catalysts or ultraviolet light and a non-reactive solvent such as benzene, toluene, xylene, or the like. Suitable initiators include various free radical-yielding, heterocyclic and alicyclic peroxides, such as diethyl peroxide, tertiary butyl hydroperoxide, dibenzoyl peroxide, ditert. butyl peroxide, dimethylthienyl peroxide, dicyclohexyl peroxide, dilauroyl peroxide and urea peroxide. These are mentioned by way of non-limting examples of suitable organic peroxides. Other initiating compounds known include emulson redox systems, such as a mixture of sodium bisulfite and persulfate, ammonium persulfate, alkali metal perborates, azo compounds, such as alpha, alpha-azodiisobutylronitrile, etc.

The following examples illustrate the preparation of suitable intermediate additives for use in preparing the sulfoxide derivatives of the present invention.

INTERMEDIATE COMPOUNDS

Example I

About 600 grams of diethylene glycol dioleate and 223.5 grams of mercaptoacetic acid were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over Na$_2$SO$_4$, filtered and the solvent stripped at 155° C. and 2 mm. pressure. The resulting product was a mixture of the 9- and 10-carboxylmethylmercaptostearate diester of diethylene glycol.

Example II

About 600 grams of triethylene glycol dioleate and 223.5 grams of mercaptoacetic acid were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over Na$_2$SO$_4$, filtered and the solvent stripped at 155° C. and 2 mm. pressure. The resulting product was a mixture of the 9- and 10-carboxymethylmercaptostearate diester of triethylene glycol.

Example III

About 600 grams of diethylene glycol ricinoleate and 223.5 grams of mercaptoacetic acid were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over Na$_2$SO$_4$, filtered and the solvent stripped at 155° C. and 2 mm. pressure. The resulting product was a mixture of the 9- and 10-carboxymethylmercapto-12-hydroxylstearate diester of diethylene glycol.

Example IV

About 600 grams of diethylene glycol dioleate and 190 grams of mercaptoethanol were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C. and 2 mm. pressure. The resulting product was a mixture of diethylene glycol di(9- and 10-[2-hydroxyethylmercapto]-stearate).

*Example V*

About 600 grams of 2,2'-thiodiethanol dioleate and 223.5 grams of mercaptoacetic acid were mixed in a flask at 20–25° C. About 240 drops (30 drops at a time) of t-butyl hydroperoxide were added over a period of 2 hours and the temperature was kept at about 37° C. The reaction mixture was diluted with 2 volumes of diethyl ether, washed with 12 liters of water to pH 4, dried over $Na_2SO_4$, filtered and the solvent stripped at 155° C. and 2 mm. pressure. The resulting product was a mixture of 2,2'-thiodiethanol di(9- and 10-carboxymethylmercaptostearate).

The final sulfoxide compounds of this invention are prepared by treating the above-described intermediate compounds represented by Formulas I and II and illustrated by Examples I–V with an inorganic acid and an aqueous solution of hydrogen peroxide or with a per(carboxylic) acid at between 0° and 100° C., preferably at ambient temperature to form compounds represented by Formula III.

The aqueous solutions of hydrogen peroxide which may be used include the normally available in commercial quantities, for example 100 volume hydrogen peroxide solution which contains about 30% by weight of hydrogen peroxide ($H_2O_2$). Aqueous solutions of hydrogen peroxide containing concentrations of hydrogen peroxide between 5 and 95% $H_2O_2$ by weight may be used to carry out the treatment. Hydrogen peroxide solutions containing between 25 to 85% by weight of $H_2O_2$ are usually used and preferably solutions containing between 30 and 50% by weight $H_2O_2$.

Inorganic acids have been found suitable for use according to the process of the present invention, such as hydrochloric, sulfuric and phosphoric acid and these acids are conveniently used in the strengths in which they are normally available in commercial quantities. The concentrations of the aqueous solutions of inorganic acid suitable for use vary with the particular acid being used. Acids in relatively high concentrations are usually preferred but it has been found that dilute aqueous solutions containing up to 50% by weight of the acid are also suitable.

Suitable organic peracids which may be used according to the present invention are the peracids of the lower fatty acids, such as performic acid, peracetic acid, perpropionic acid and perbutyric acid, the peracids of the substituted lower fatty acids, such as monochloroperacetic acid and trichlorperacetic acid and the peracids of the aromatic carboxylic acids, such as perbenzoic acid. Of these, performic acid, peracetic acid and trichlorperacetic acid are the most effective and performic and peracetic acids are preferred.

The peracids may be used in the present process either as such or in statu nascendi. Thus, instead of treating the compound of Formula II with a performed organic peracid, they may be treated with a mixture of the organic acid and hydrogen peroxide, these reagents may be used in stoichiometric proportions but generally it is preferably to employ excess of the acid.

The peroxide of peracid treatment of thioether-ester compounds is generally effected at ambient temperatures, although my other convenient temperature, such as between 0° and 100° C., may be employed. The thioether-ester compound and the peracid should be well agitated to ensure intimate contact and, with good agitation, the reaction should be completed in a period of from 30 to 120 minutes.

A convenient method of effecting the treatment is to mix a thioether-ester compound with the necessary proportion of aqueous solution of hydrogen peroxide and with the organic acid. The hydrogen peroxide solution is conveniently used in the form in which it is readily available commercially, for example as "100-volume" hydrogen peroxide which contains 30% by weight of hydrogen peroxide. Similarly, the organic acid is conveniently used in the form in which it is available commercially. Thus, formic acid may be used as the commercial acid containing 90% by volume of $H \cdot COOH$, whereas acetic acid can be used as glacial acetic acid. More dilute aqueous solutions of formic acid may be used, such as those containing 20 to 50% by volume of $H \cdot COOH$. In the case of solid organic acids such as trichloroacetic acid, these may be dissolved in a suitable solvent such as water or a low boiling alcohol before adding to the thioether-ester compound and hydrogen peroxide solution, or they may be dissolved or dispersed in the hydrogen peroxide solution before mixing and reacting the constituents.

The following examples illustrate the preparation of the final 10 additives (sulfoxides) of this invention.

FINAL PRODUCT

*Example IA*

About one mol of the additive of Example I (mixture of 9- and 10-carboxymethylmercaptostearate diester of diethylene glycol) was mixed with an equivalent amount of hydrogen peroxide-acetic acid solution and mixture was stirred for 24 hours at room temperature. The sulfoxide product recovered by ether extraction was a mixture of 9- and 10-carboxymethylsulfoxy stearate diesters of diethylene glycol. The product is oil-soluble and exhibits excellent extreme pressure properties.

*Example IIA*

The procedure of Example IA was followed using the additive of Example II to form as the final product the mixture of 9- and 10-carboxymethylsulfoxystearate diesters of triethylene glycol.

*Example IIIA*

The mixture of 9- and 10-carboxymethylmercapto-12-hydrostearate diester of diethylene glycol was treated with peracetic acid solution for 24 hours at room temperature and recovered by ether extraction was 9- and 10-carboxymethylsulfoxy-12-hydroxystearate diester of diethylene glycol.

*Example IVA*

The procedure of Example IA was followed to treat a mixture of 2,2'-thiodiethanol di(9- and 10-carboxymethylmercaptostearate) to form a mixture of 2,2'-sulfoxydiethanol di(9- and 10-carboxymethylsulfoxystearate) which product exhibited excellent extreme pressure properties.

*Example VA*

2,2'-thiodiethanol di(9- and 10-carboxymethylmercaptostearate) was treated with a solution of hydrogenperoxide and acetic acid at room temperature for 24 hours and on ether extracting 2,2'-sulfoxydiethanol di(9- and 10-carboxymethylsulfoxystearate) was recovered. Other compounds illustrating the invention include dicarboxymethyl sulfoxystearate diester of ethylene glycol and di(carboxymethylsulfoxy) substituted 2,2'-sulfoxy ethanol dioleate.

The sulfoxy-modified polyether-esters are oil-soluble and can be used in amounts of from 0.5% to about 20%, preferably from about 1% to about 5% by weight.

Lubricating oils in which the additives of this invention can be used include one or more of a variety of synthetic oils, e.g., di-2-ethylhexylsebacate or copolymers of polyalkylene oxide and alkylene glycol or natural hydrocarbon oils having a viscosity range of from 50 SUS at 100° F. to 250 SUS at 210° F. (SAE viscosity number ranging from SAE 10W to SAE 90).

Suitable oils are the gas turbine lube oils having the following properties:

| Grade | 1010 | 1065 |
|---|---|---|
| Flash, COC, ° F | 300 | 465 |
| Pour, ° F | −10 | 0 |
| Viscosity, SUS at 100° F | 59.4 | 530 |
| Neutral Number | 0.02 | 0.01 |
| Ash | None | None |

The following compositions are illustrative of the invention, the percentages being by weight:

Composition A:
    Example IA additive _____ 2%.
    1010 mineral oil _____ Essentially balance.
Composition B:
    Example IIA additive _____ 2%.
    1010 mineral oil _____ Essentially balance.
Composition C:
    Example IIIA additive _____ 2%.
    1010 mineral oil _____ Essentially balance.
Composition D:
    Example IVA additive _____ 2%.
    1010 mineral oil _____ Essentially balance.
Composition E:
    Example IIA additive _____ 1%.
    SAE 30 mineral oil _____ Essentially balance.
Composition G:
    Example VA additive _____ 2%.
    SAE 90 mineral oil _____ Essentially balance.
Composition H:
    Example IA _____ 2%.
    Lauric acid _____ 2%.
    SAE 90 mineral oil _____ Essentially balance.
Composition I:
    Example IA additive _____ 5%.
    Polyethylene-propylene glycol having a SUS at 100° F. of 660 _____ Essentially balance.
Composition J:
    Example IA additive _____ 2%.
    Di-2-ethylhexyl sebacate _____ Essentially balance.

Compositions of this invention were evaluated for their extreme pressure properties on a Spur-Gear machine. The machine consists essentially of two geometrically similar pairs of gears connected by two parallel shafts. The gear pairs are placed in separate gear boxes, which also contain the supporting ball bearings. One of the shafts consist of two sections connected by a coupling. Loading is accomplished by locking one side of the coupling and applying torque to the other. The conditions of the test were:

Speed _____r.p.m__ 3200
Oil temperature _____° C__ 100
Oil flow-rate _____cc./sec__ 10
Load in increments; 5 min. at each setting.

Results of the evaluations are given in Table I and for purpose of comparison, the results obtained from the use of the base oil alone and with other known extreme pressure compositions are also given.

TABLE I.—COMPOSITION

| | Score load, lbs./in. |
|---|---|
| A, B, C and E | 12,000 |
| 1010 mineral oil +2% $C_{16}$ alkenyl succinic acid | 1,400 |
| 1010 mineral oil +2% malonic acid | 2,800 |
| 1010 mineral oil +2% 3-hexadecyl adipic acid | 1,400 |
| 1010 mineral oil +2% dodecyl-mercaptosuccinic acid | 1,400 |
| 1010 mineral oil +10% glycerol monooleate | 1,800 |
| 1010 mineral oil +2% $C_{13}H_{27}OH$ ("OXO" process) | 600 |
| 1010 mineral oil | 600 |

The data show the outstanding enhancement of the load-carrying ability of the oil effected by the mercapto-containing compounds of the invention, as represented by those of Compositions A, B, C and E. On the other hand, malonic acid, succinic acid, 3-hexadecyl adipic acid and $C_{16}$-alkenyl succinic acid as well as sulfur-containing acids outside the scope used by applicant such as dodecyl-mercaptosuccinic acid are poor load carrying agents.

The sulfoxide-containing compounds of this invention are useful also for providing superior load-carrying properties for lubricating oils which contain minor amounts of other agents, such as silicone anti-foaming agents, alkylphenol anti-oxidants, polyacrylate ester viscosity index improvers, long chain acids such as lauric and oleic acids as oiliness agents and the like.

I claim as my invention:
1. As a compound, a disulfoxy containing compound, the sulfoxy radical being represented by the formula

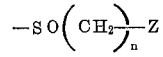

where Z is an oxygen-containing radical selected from the group consisting of OR''' and —COOR''' where R''' is selected from the group consisting of hydrogen and a $C_{1-4}$ alkyl radical and $n$ is an integer of from 1 to 4, of an ester of an aliphatic unsaturated fatty acid selected from the group consisting of oleic acid and ricinoleic acid, the sulfoxy groups being attached to the 9(10) carbon atoms of the fatty acid and a polyoxyalkylene diol or its thio derivative having the formula,

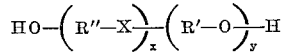

where R' and R'' are the same or different alkyl radicals of from 2 to 8 carbon atoms, X is oxygen or sulfur and X and Y are integers of at least 1.

2. As a compound, a polyethylene glycol di(9(10) carboxy $C_{1-4}$ alkyl sulfoxy) substituted stearate diester of polyethylene glycol.

3. As a compound, 2,2'-sulfoxydiethanol di(9(10) carboxymethylsulfoxystearate).

4. As a compound, diethylene glycol di(9(10)-carboxymethylsulfoxystearate).

No references cited.

CHARLES B. PARKER, *Primary Examiner.*
ANTON H. SUTTO, *Assistant Examiner.*